United States Patent [19]
Somiya et al.

[11] Patent Number: 5,851,650
[45] Date of Patent: Dec. 22, 1998

[54] MAGNETIC RECORDING MEDIUM INCLUDING A BACKCOAT LAYER CONTAINING A SPECIFIED VINYL CHLORIDE COPOLYMER

[75] Inventors: Akira Somiya; Shigeo Kurose, both of Saku, Japan

[73] Assignee: TDK Corporation, Tokyo, Japan

[21] Appl. No.: 798,104

[22] Filed: Feb. 12, 1997

[30] Foreign Application Priority Data

Feb. 15, 1996 [JP] Japan ..................................... 8-052460

[51] Int. Cl.$^6$ ........................................................ G11B 5/70
[52] U.S. Cl. .......................... 428/323; 428/332; 428/522; 428/694 BG; 428/694 BB; 428/900
[58] Field of Search .................................... 428/323, 522, 428/694 BG, 694 BB, 900, 332

[56] References Cited

U.S. PATENT DOCUMENTS

| | | | |
|---|---|---|---|
| 4,880,693 | 11/1989 | Ryoke et al. | 428/323 |
| 4,886,703 | 12/1989 | Hasumi et al. | 428/323 |
| 5,098,783 | 3/1992 | Watanabe et al. | 428/323 |
| 5,510,140 | 4/1996 | Kurose et al. | |
| 5,616,398 | 4/1997 | Kurose et al. | |

FOREIGN PATENT DOCUMENTS

| | | |
|---|---|---|
| 0 651 379 | 5/1995 | European Pat. Off. |
| 1-91316 | 4/1989 | Japan |
| 2-260223 | 10/1990 | Japan |
| 6-64727 | 8/1994 | Japan |

*Primary Examiner*—Stevan A. Resan
*Attorney, Agent, or Firm*—Oblon, Spivak, McClelland, Maier & Neustadt, P.C.

[57] ABSTRACT

The magnetic recording medium of this invention comprises a magnetic layer formed on one of the opposite surfaces of a nonmagnetic support and a backcoat layer using a nonmagnetic powder and a binder as main components thereof and formed on the other surface thereof and uses as the binder in the backcoat layer a vinyl chloride-based copolymer having an amine-modified vinyl unit and an acidic functional group-containing vinyl unit. Owing to this construction, a paint to be used therein realizes perfect dispersibility and perfect stability. As a result, the backcoat layer to be formed therein is enabled to acquire excellent surface properties and the magnetic recording medium to be finally produced is allowed to exhibit an excellent electromagnetic conversion property.

6 Claims, 1 Drawing Sheet

MAGNETIC RECORDING MEDIUM INCLUDING A BACKCOAT LAYER CONTAINING A SPECIFIED VINYL CHLORIDE COPOLYMER

BACKGROUND OF THE INVENTION

1. Field of the Invention

This invention relates to a magnetic recording medium provided on one of the opposite surfaces of a nonmagnetic support with a magnetic layer and on the other surface thereof with a backcoat layer having a nonmagnetic powder and a binder as main components thereof and more particularly to the composition of the binder in the backcoat layer.

2. Description of the Prior Art

In recent years, the magnetic recording medium has come to require the magnetic layer thereof to possess a smooth surface and exhibit high running stability on account of the trend of the recording wavelength to be employed in the operation thereof toward a decrease in dimension and an increase in density. As means to improve the surface smoothness and the running stability, the backcoat layer in particular has been gaining in importance.

The electromagnetic conversion property of the magnetic recording medium is exalted by improving the surface roughness (Ra) of the backcoat layer thereby smoothing the surface of the backcoat layer. As the factors that govern the quality of the surface, the dispersibility of the components of the paint to be used for the formation of the backcoat layer and the stability of the paint may be cited.

One means to ensure a smooth surface for the backcoat layer resides in proper selection of the configuration of the vinyl unit as the functional group of a vinyl chloride-based copolymer which is contained as a binder in the backcoat layer. This selection determines the dispersibility of the paint for the backcoat and consequently determines the smoothness of the surface of the backcoat layer. By selecting the configuration of the functional group vinyl unit as a proper choice, therefore, the backcoat layer is improved in the surface roughness Ra and enabled to acquire an excellent electromagnetic conversion property.

From this point of view, JP-B-06-64727, JP-A-01-91316, and JP-A-02-260223, for example, have made proposals to the effect that the smoothness of the backcoat layer is improved by using a vinyl chloride-based copolymer having an amine-modified vinyl unit for the binder in the backcoat layer.

The paints proposed by the relevant inventions, however, do not manifest stability deserving high esteem while they are in the process of manufacture, especially, while they are diluted from a viscosity appropriate for dispersion to a viscosity appropriate for coating. As a result, the paints themselves often show a very instable behavior, suffer degradation of dispersibility (degree of glossiness), and degrade the surface property of the backcoat layer.

A typical technique in popular use secures surface smoothness for the backcoat layer by using as the binder in the backcoat layer a vinyl chloride-based copolymer having an acidic functional group-containing vinyl unit. Though this technique poses no problem in terms of the stability of a paint, the dispersion of this paint is not so perfect as that of a paint having an amine-modified vinyl unit in the vinyl chloride-based copolymer and, therefore, may well be regarded as securing no fully satisfactory surface smoothness for the backcoat.

This invention has been originated in due recognition of the true state of prior art described above. An object of this invention is to provide a magnetic recording medium which is enabled to acquire an excellent electromagnetic conversion property by causing the backcoat layer thereof to contain a binder capable of imparting excellent dispersibility and excellent stability as well to a paint and, as a result, permitting formation of the backcoat layer with excellent surface properties.

SUMMARY OF THE INVENTION

To accomplish this object, this invention is directed to a magnetic recording medium provided on one of the opposite surfaces of a nonmagnetic support with a magnetic layer and on the other surface thereof with a backcoat layer having a nonmagnetic powder and a binder as main components thereof, and characterized by causing the binder in the backcoat layer to contain a vinyl chloride-based copolymer having an amine-modified vinyl unit and an acidic functional group-containing vinyl unit.

In a preferred embodiment of this invention, the content of the amine-modified vinyl unit is in the range of 0.03 to 2.3% by weight, based on the amount of the vinyl chloride-based copolymer and the content of the acidic functional group-containing vinyl unit is in the range of 0.05 to 1.8% by weight, based on the amount of the vinyl chloride-based copolymer.

In a preferred embodiment thereof, the content of the amine-modified vinyl unit is in the range of 0.1 to 1.8% by weight, based on the amount of the vinyl chloride-based copolymer.

In a preferred embodiment thereof, the vinyl chloride-based copolymer has an average polymerization degree in the range of 200 to 800.

In a preferred embodiment thereof, the content of the vinyl chloride-based copolymer is in the range of 20 to 80% by weight to the total amount of the binder in the backcoat layer.

In a preferred embodiment thereof, the nonmagnetic powder in the backcoat layer is carbon black and the carbon black comprises a small-diameter carbon black having an average particle diameter in the range of 15 to 30 nm and a large-diameter carbon black having an average particle diameter in the range of 200 to 400 nm.

In a preferred embodiment thereof, the two kinds of carbon black having different average particle diameters mentioned above are mixed at a ratio such that the content of the large-diameter carbon black is in the range of 0.5 to 5 parts by weight, based on 100 parts by weight of the small-diameter carbon black.

DETAILED DESCRIPTION OF THE INVENTION

Figure 1:
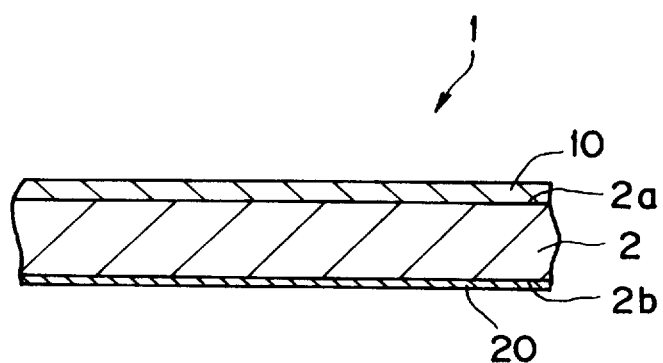
FIG. 1 is a cross section schematically showing the laminar structure of the magnetic recording medium of this invention.

Now, the specific construction of this invention will be described in detail below.

A magnetic recording medium 1 of this invention, as shown in FIG. 1, is provided on one 2a of the opposite surfaces of a nonmagnetic support 2 with a magnetic layer 10 and on the other surface 2b thereof with a backcoat layer 20. The backcoat layer 20 contains a nonmagnetic powder and a binder as main components thereof. The binder, as will be described in detail afterward, contains a vinyl chloride-based copolymer having an amine-modified vinyl unit and an acidic functional group-containing vinyl unit.

The binder of this invention is used in such a form as contains therein the vinyl chloride-based copolymer which has the amine-modified vinyl unit and the acidic functional group-containing vinyl unit contained in one and the same molecular unit thereof. Consequently, a paint to be prepared for the formation of a backcoat layer is enabled to acquire excellent dispersibility and stability. The backcoat layer to be formed by the use of this paint is endowed with perfect surface smoothness. As a result, the magnetic recording medium to be produced can acquire an excellent electromagnetic conversion property as a characteristic quality.

Appropriately, in the vinyl chloride-based copolymer which has the amine-modified vinyl unit and the acidic functional group-containing vinyl unit contained in one and the same molecular unit thereof, the content of the amine-modified vinyl unit is in the range of 0.03 to 2.3% by weight, preferably 0.05 to 2.0% by weight, and particularly preferably 0.1 to 1.8% by weight. If the amine-modified vinyl unit content exceeds 2.3% by weight, the paint will be deprived of stability. Conversely, if this content is less than 0.03% by weight, the nonmagnetic powder such as carbon black will suffer degradation of dispersibility. The content of the acidic functional group-containing vinyl unit in the vinyl chloride-based copolymer is appropriately in the range of 0.05 to 1.8% by weight, preferably 0.1 to 1.8% by weight, and particularly preferably 0.5 to 1.5% by weight. If the acidic functional group-containing vinyl unit content exceeds 1.8% by weight, the paint for the backcoat layer will tend to increase in thixotropy and the backcoat layer formed thereof will tend to suffer degradation of surface smoothness. If this content is less than 0.05% by weight, the disadvantage arises that the paint for the formation of the backcoat layer will tend to lose stability and induce agglomeration and the backcoat layer formed thereof will suffer degradation of surface properties.

As concrete examples of the functional group which is contained in the acidic functional group-containing vinyl unit, carboxyl group, sulfonate group, sulfate group, and phosphonate group may be cited. The acidic functional group-containing vinyl unit contains at least one of the functional groups mentioned above. The vinyl unit of this description may be in any the normally conceivable forms so long as it possesses one of the functional groups enumerated above. The vinyl units containing a carboxyl group, for example, include maleic acid, fumaric acid, acrylic acid, and methacrylic acid, for example. The vinyl units containing a sulfonate group include sodium styrene sulfonate, sodium vinyl sulfonate, sodium methacryl sulfonate, and sulfoethyl acrylate, for example. Among other conceivable vinyl units, maleic acid and fumaric acid which have the carboxyl group, sulfoethyl acrylate and sodium methacryl sulfonate which have the sulfonate group, and 2-acid phosoxyethyl methacrylate which has the phosphate group prove particularly advantageous.

The amine-modified vinyl unit which is contained in the vinyl chloride-based copolymer mentioned above which is used in this invention contains an amino group. The amino group may be an unsubstituted amino or a substituted amino group, whichever better suits the occasion. The incorporation of the amino group in the amine-modified vinyl unit can be attained, for example, by treating the vinyl chloride-based copolymer containing the acidic functional group-containing vinyl unit together with a varying amine compound which is be specifically described herein below. Incidentally, the amine-modified vinyl unit is allowed to incorporate additionally therein any of the various functional groups cited above as concrete examples of the functional group contained in the acidic functional group-containing vinyl unit.

The copolymer which is used as the binder in the magnetic recording medium of this invention is a vinyl chloride-based copolymer having the amine-modified vinyl unit and the acidic functional group-containing vinyl unit mentioned above and further containing, as the component units of the copolymer, a vinyl chloride and an alkyl carboxylic vinyl ester and optionally vinyl alcohol.

As the alkyl carboxylic vinyl ester, possibly adopted as one of the component units of the copolymer mentioned above, it is appropriate to use vinyl acetate from the viewpoint of the price of raw material. It is otherwise allowable to use vinyl propionate, vinyl vercatate, etc. The vinyl alcohol is obtained by saponifying the alkyl carboxylic acid moiety of the alkyl carboxylic vinyl ester. The content of the alkyl carboxylic vinyl ester is in the range of 0.5 to 10% by weight, preferably 1.0 to 5.0% by weight. The content of the vinyl alcohol, a component which may be optionally contained, is not more than 8.0% by weight, preferably in the range of 3.0 to 6.0% by weight. Appropriately, the remainder is substantially vinyl chloride. If the content of the alkyl carboxylic vinyl ester exceeds 10% by weight, the paint prepared for the formation of the backcoat layer will tend to suffer degradation of affinity for carbon black in particular within nonmagnetic powder and will manifest poor dispersibility. Conversely, if the content of the alkyl carboxylic vinyl ester is less than 0.5% by weight, the resin will tend to suffer degradation of solubility. If the content of the vinyl alcohol, a component which is optionally incorporated, exceeds 8.0% by weight, the copolymer will tend to lose thermal stability and suffer degradation of shelf life because of an increase in the ratio of saponification.

The average polymerization degree of this copolymer is appropriately in the range of 200 to 800, preferably 300 to 500. If the average polymerization degree is unduly high, the copolymer will tend to suffer degradation of solubility and dispersibility. If this degree is unduly low, the backcoat layer will tend to lose strength to the extent of incurring excoriation of layer and bringing about an addition to dropout.

This copolymer is allowed to incorporate additionally therein other monomer components such as, for example, allyl glycidyl ether and 2-hydroxymethyl methacrylate, in a combined amount not exceeding about 0.5% by weight.

The copolymer to be used in this invention may have been manufactured in any manner. It is produced, for example, by copolymerizing vinyl chloride, an alkyl carboxylic vinyl ester, or a monomer containing any of the functional groups contained in such acidic functional group-containing vinyl units as maleic acid and fumaric acid, for example, which are cited above by the technique of suspension polymerization, emulsion polymerization, solution polymerization, or bulk polymerization. Specifically, vinyl chloride, an alkyl carboxylic vinyl ester (such as, for example, vinyl acetate), peroxy dicarbonate (initiating agent), and partially saponified vinyl alcohol are combined and stirred and simultaneously heated to 50° C. to initiate a reaction destined to effect polymerization. Further, vinyl chloride is continuously added to the reaction mixture to induce copolymerization. The resultant copolymerization mixture is cooled, separated by filtration, washed with methanol, and further washed with deionized water, separated by filtration, and dried to obtain a vinyl chloride-vinyl acetate-maleic acid copolymer in the form of a powder. The copolymer thus obtained and methanol, N,N-dimethyl ethanol amine, and sodium hydroxide added thereto are left reacting at 40° C. and acetic acid is further added thereto to neutralize the unaltered sodium hydroxide. The reaction solution is washed with methanol, further washed with deionized water, and subjected to filtration and desiccation to obtain a vinyl chloride—vinyl acetate—vinyl alcohol—maleic acid N,N-dimethyl ethanol amine-modified vinyl unit copolymer in the form of a powder.

The amine compounds usable for the amine modification mentioned above include such primary, secondary, and tertiary amines as aliphatic amines, alicyclic amines, aromatic amines, alkanol amines, and alkoxyalkyl amines, for example. As concrete examples of the amine compounds, methyl amine, ethyl amine, propyl amine, butyl amine, cyclohexyl amine, ethanol amine, naphthyl amine, aniline, o-toluidine, diethyl amine, dioctyl amine, diisobutyl amine, diethanol amine, methylethanol amine, dimethylethanol amine, dibutylethanol amine, methylethanol amine, 2-methoxyethyl amine, N-methyl aniline, trimethyl amine, triethyl amine, triisobutyl amine, tridecyl amine, N-methylbutyl amine, N-methyldiphenyl amine, hexamethylene tetramine, triethanol amine, tributyl amine, dimethylpropyl amine, pyridine, α-picoline, β-picoline, γ-picoline, 2,4-lutidine, quinoline, morpholine, sodium taurate, potassium sulfanilate, cetylamine sulfonic acid, diaminopropane, and hexamethylene diamine may be cited. Among other amine compounds cited above, tertiary amines prove most advantageous because they excel in dispersibility and stability of paint.

The paint to be prepared for the formation of the backcoat layer is enabled to acquire excel lent dispersibility and stability by causing the binder to incorporate therein the vinyl chloride-based copolymer having the amine-modified vinyl unit and the acidic functional group-containing vinyl unit contained in one and the same molecular unit thereof as described above. Even when the vinyl chloride-based copolymer having the amine-modified vinyl unit and the vinyl chloride-based copolymer having the acidic functional group-containing vinyl unit are mixed and the mixture is used in the place of the copolymer mentioned above, the effect that is obtained by using the vinyl chloride-based copolymer having the amine-modified vinyl unit and the acidic functional group-containing vinyl unit contained in one and the same molecular unit as contemplated by this invention is not obtained.

The binder to be used in this invention, when necessary, is used in combination with at least one kind of other resin and is appropriately made to contain the copolymer mentioned above in an amount in the range of 20 to 80% by weight, based on the total weight of the binder. Polyurethane resin, for example, may be cited as the other resin to be used. The additional use of the other resin can be expected to exalt further the dispersibility of the paint and, at the same time, improve the backcoat layer in such physical properties as scraping.

The polyurethane resin to be effectively used herein may be any of the various species which are generally used for the binder in the magnetic recording medium. Particularly, the species of polyurethane resin which has a polar group proves advantageous because it is capable of further enhancing the dispersibility of carbon black, for example. If the polyurethane resin to be used has no polar group, the dispersibility of carbon black, for example, will be impaired, the product of application of the paint (backcoat layer) will suffer degradation of surface properties and will consequently bring about such adverse effects as inducing transfer of the applied paint to the magnetic layer and, as a consequence, the electromagnetic conversion property will be degraded.

The polar group which is contained in the polyurethane resin is appropriately at least one member selected from the class consisting of sulfur-containing sulfonic acid groups, sulfuric acid groups or esters or salts thereof, phosphorus-containing phosphonic acid groups, phosphinic acid groups, phosphoric acid groups or esters or salts thereof, and carboxylic acid groups, preferably from the class consisting of sulfonic acid groups (—$SO_3Y$), carboxylic acid groups (—COOY), and phosphonic acid groups (—$PO_3Y$), wherein Y may be H or any of alkali metals. Properly, the polar group is contained in an amount in the approximate range of 0.1 to 5 molecules per molecule of the polymer.

The content of the polyurethane resin is appropriately in the approximate range of 20 to 80% by weight, based on the total amount of the binder. If this content is unduly large, the film formed of the paint will tend to lose strength and suffer degradation of the durability to withstand the impact of running. Conversely, if the content is unduly small, the film of backcoat will tend to become rigid and brittle possibly to the extent of compelling the backcoat to incur such disadvantages as scraping.

As a cross-linking agent for hardening the binding agent, it is advantageous to use various polyisocyanates, particularly diisocyanates. It is especially advantageous to use the reaction product of at least one member selected from the group consisting of tolylene diisocyanate, hexamethylene diisocyanate, and methylene diisocyanate with trimethylol propane. The use of this cross-linking agent causes the backcoat layer to harden because the cross-linking agent reacts with the nitrogen atom, hydroxyl group, active hydrogen group, etc. of the copolymer mentioned above and further undergoes a cross-linking reaction with the active hydrogen group, etc. of the polyurethane and polyester. Properly, the content of the cross-linking agent is in the range of 10 to 30 parts by weight, based on 100 parts by weight of the binder.

The backcoat layer 20 is allowed to incorporate therein a nonmagnetic powder which may be selected from among carbon black, α-alumina, β-alumina, γ-alumina, θ-alumina, δ-alumina, dichromium trioxide, α-iron oxide, goethite, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and man-made diamond, for example.

As an appropriate example of the nonmagnetic powder to be contained in the backcoat layer 20, carbon black is cited. The particles of the carbon black to be used may be in any of various known shapes. In order to acquire improved surface properties, the backcoat layer 20 appropriately contains carbon black having the following particle diameters. Specifically, it contains two kinds of carbon black, i.e. a small-diameter carbon black having an average particle diameter in the range of 15 to 30 nm, particularly 17–28 nm, and a BET value in the approximate range of 100 to 300 $m^2/g$ and a large-diameter carbon black having an average particle diameter of 200 to 400 nm, particularly 250 to 370 nm, and a BET value in the range of 5 to 20 $m^2/g$. Properly, the two kinds of carbon black having different average particle diameters mentioned above are mixed at a ratio such that the content of the large-diameter carbon black may be in the range of 0.5 to 5 parts by weight, based on 100 parts by weight of the small-diameter carbon black. The total content of the binder to be used in the backcoat layer 20 appropriately is in the range of 40 to 200 parts by weight, preferably 50 to 150 parts by weight, and more preferably 60 to 120 parts by weight. If the content of the binder is unduly large, the tape will tend to incur running trouble because of a consequent increase in the friction of the cassette half against the tape pad or guide and the backcoat layer 20 will pose such problems as blocking with the magnetic layer as well. Conversely, if the content is unduly small, the backcoat layer will tend to lose strength and suffer degradation of the durability to withstand the impact of running. Properly, the copolymer which constitutes one of the essential components of the magnetic recording medium of this invention accounts for a proportion in the range of 20 to 80% by weight to the whole of the binder as mentioned above.

Further, the backcoat layer is allowed to use lubricants such as higher fatty acids, fatty acid esters, and silicone oils; dispersants such as surfactants; and other various known additives as occasion demands.

For the formation of the backcoat layer 20, a paint having the aforementioned prescribed composition is prepared and is applied on the nonmagnetic support 2 as shown in FIG. 1. The solvent to be used as contained in this paint has no particular limit to impose. From the group consisting of ketones such as methylethyl ketone, methylisobutyl ketone, and cyclohexanone and aromatic hydrocarbons such as toluene, one or more members may be suitably selected, depending on the purpose. The content of the solvent in the paint is not particularly limited.

The nonmagnetic support 2 which is used herein has no particular limit to impose. A material suitably selected from among various flexible materials and various rigid material, depending on the purpose, may be shaped like a tape of prescribed dimensions in accordance with a varying specification. The flexible materials include polyethylene terephthalate, polyethylene naphthalate, and other similar polyesters, for example.

The backcoat layer 20 properly is formed by applying the paint to the support by the known method, drying the applied layer of the paint, subjecting the dried layer of the paint normally to a surface-smoothing treatment, and thereafter hardening the layer of smooth surface. Appropriately, the backcoat layer 20 after being dried has a thickness in the approximate range of 0.2 to 2.0 μm.

The backcoat layer 20 which is formed as described above properly has a coefficient of friction, "μ", of not more than 0.25, and generally in the range of 0.12 to 0.20. If the coefficient of friction, "μ", is unduly large, the running stability of the backcoat layer 20 will be degraded possibly to the extent of entailing such troubles as adhesion of the backcoat layer 20 to the guide, for example.

The magnetic layer 10 which is formed on one 2a of the opposite surfaces of the nonmagnetic support 2 (the surface opposite the surface for basing the backcoat layer 20) has no particular limit to impose on the construction thereof. The magnetic layer of the so-called coating type which has such a ferromagnetic powder as, for example, fine oxide powders of $\gamma$-$Fe_2O_3$, Co-containing $\gamma$-$Fe_2O_3$, $Fe_3O_4$, Co-containing $Fe_3O_4$, and $CrO_2$ or fine powders of Fe, Co, Ni, or alloys thereof contained therein in conjunction with the binder or the magnetic layer of the continuous thin film type which is formed by vacuum deposition or sputtering can be used, whichever better suits the occasion. Incidentally, the magnetic layer 10 is formed on the surface of the nonmagnetic support 2 opposite the surface thereof basing the backcoat layer 20 as already described. When this magnetic layer 10 is formed of the magnetic layer of the coating type, the question of the order in which either of the magnetic layer 10 and the backcoat layer 20 is formed on the nonmagnetic support prior to the other does not matter. In contrast, when the magnetic layer 10 is formed of the magnetic layer of the continuous thin film type, generally the backcoat layer 20 is formed after the magnetic layer 10 has been formed.

Now, this invention will be described more specifically below with reference to working examples.

The paint for the formation of the backcoat layer and the magnetic paint for the formation of the magnetic layer were severally prepared by the following procedures.

Manufacture of Paint for Backcoat Layer

[Preparation of Binder Solution]

Vinyl chloride-based copolymer (vinyl chloride—vinyl acetate—vinyl alcohol—amine modified vinyl unit—acidic functional group-containing vinyl unit copolymer: monomer weight ratio=91:3:5:0.5:0.5, average polymerization degree=400) . . . 35 parts by weight Polyester polyurethane resin (containing —$SO_3Na$ group, Mn=40000, Tg=20° C.) . . . 35 parts by weight MEK (methyl ethyl ketone) . . . 100 parts by weight Toluene . . . 80 parts by weight Cyclohexanone . . . 100 parts by weight In an agitator, the components mentioned above were mixed by stirring for six hours to form a binding solution. The binder solution was refined by 8 hours' circulating filtration with a depth filter having a 95% cut filtration accuracy=5.0 μm.

The vinyl chloride-based copolymer mentioned above was synthesized by the following method.

In an autoclave provided with a stirring device, methanol, vinyl chloride, vinyl acetate, maleic acid, di(2-ethylhexyl)-peroxy dicarbonate, and partially saponified vinyl alcohol were charged, stirred and meanwhile heated to 50° C. under an atmosphere of nitrogen gas to initiate a reaction and vinyl chloride was further added thereto continuously to induce a copolymerization reaction. The autoclave was relieved of residual pressure and cooled. Then the copolymer slurry was extracted from the autoclave, filtered, then washed three times with methanol and two times with deionized water, and filtered and desiccated to obtain a vinyl chloride—vinyl acetate—maleic acid copolymer powder. In a reaction vessel provided with a cooling tube, the copolymer, methanol, N,N-dimethylethanol amine, and sodium hydroxide were charged, left reacting at 40° C. and cooled and acetic acid was added thereto to neutralize the unaltered sodium hydroxide. The resultant reaction solution was washed three times with methanol, further washed two times with deionized water, filtered, and dried to obtain a vinyl chloride—vinyl acetate—vinyl alcohol—maleic acid N,N-dimethylethanol amine-modified vinyl copolymer powder. In this copolymer, the amino group was directly bonded to the vinyl group.

[Kneading Dispersing Treatment]

The following components were charged in a pressure kneader and mixed by kneading for two hours.

Carbon black (produced by Mitsubishi Chemical and marketed under product code of "#47B", average particle diameter 23 nm, BET 130 $m^2$/g, amount of DBP absorbed 64 ml/100 g) . . . 100 parts by weight Carbon black (produced by Columbian Chemicals and marketed under product code of "MT-CI", average particle diameter 350 nm, BET 8 $m^2$/g, amount of DBP absorbed 41 ml/100 g) . . . 1 part by weight α-Fe$_2$O$_3$ (produced by Toda Kogyo and marketed under product code of "TF-100", BET 11.5 m$^2$/g, amount of DBP absorbed 25 ml/100 g) . . . 1 part by weight Binder solution . . . 130 parts by weight The resultant product of kneading was adjusted to the viscosity optimum for a dispersing treatment by the addition of the following components.

Binder solution . . . 45 parts by weight

MEK (methyl ethyl ketone) . . . 70 parts by weight

Toluene . . . 55 parts by weight

Cyclohexanone . . . 70 parts by weight

The resultant blend was subjected to a dispersing treatment with a sand mill.

[Step of Adjusting Viscosity]

A viscosity-adjusting liquid was prepared by charging the following components in an agitator and mixing them by stirring for one hour.

Binder solution . . . 175 parts by weight

Stearic acid . . . 1 part by weight

Myristic acid . . . 1 part by weight

Butyl stearate . . . 1 part by weight

MEK (methyl ethyl ketone) . . . 200 parts by weight

Toluene . . . 250 parts by weight

Cyclohexanone . . . 200 parts by weight

The viscosity-adjusting liquid was subjected to 8 hours' circulating filtration with a depth filter having a 95% cut filtration accuracy=1.2 μm.

The viscosity-adjusting liquid after the circulating filtration and the slurry after the dispersing treatment were mixed and the resultant mixture was dispersed with a sand mill to obtain a paint, 10 cp in viscosity, for the formation of the backcoat layer. This paint was subjected to 8 hours' circulating filtration with a depth filter having a 95% cut filtration accuracy=1.2 μm. The viscosity adjustment was carried out by measuring the viscosity with a soliquid meter produced by Rheology-sha and marketed under product code of "MR-300," with the liquid temperature kept at 20° C. and the shear velocity at 3000 sec$^{-1}$.

[Step of Final Adjusting Paint]

A paint for the formation of the backcoat layer was obtained by mixing 100 parts by weight of the paint after the filtration with 1.0 part by weight of an isocyanate compound (produced by Nippon Poriuretan and marketed under trademark designation of "Coronate L").

Various paints for the formation of the backcoat layer as shown in Table 1 were further prepared by following the procedure for the preparation of the paint for the formation of the backcoat layer described above. During the preparation of these paints, the weight ratio of monomers of vinyl chloride-based copolymer, average polymerization degree, and ratio of contents of the component monomers were mainly varied.

Production of Magnetic Paint

[Preparation of Binder Solution]

A binder solution was obtained by charging the following components in an agitator and mixing them for 6 hours.

Vinyl chloride type resin (produced by Nihon Zeon and marketed under product code of "MR-110") . . . 10 parts by weight Polyester polyurethane resin (containing —SO$_3$Na group, Mn=40000, Tg=20° C.) . . . 5 parts by weight Polyester polyurethane resin (containing —SO$_3$Na group, Mn=40000, Tg=25° C.) . . . 2 parts by weight MEK (methyl ethyl ketone) . . . 21 parts by weight Toluene . . . 21 parts by weight Cyclohexanone . . . 21 parts by weight The binder solution was refined by being subjected to 8 hours' circulating filtration with a depth filter having a 95% cut filtration accuracy=5.0 μm.

[Kneading Dispersing Treatment]

The following components were charged in a pressure kneader and kneaded therein for 2 hours.

Co-coated γ-iron oxide magnetic powder (Hc=800 Oe σ=70 emu/g, specific surface area=45 m$^2$/g) . . . 100 parts by weight σ-Al$_2$O$_3$ (produced by Suminoto Chemical and marketed under product code of "HIT-50") . . . 5 parts by weight Cr$_2$O$_3$ (produced by Nihon Kagakukogyo and marketed under product code of "U-1") . . . 5 parts by weight Binder solution 40 parts by weight The resultant blend and the following components were dispersed to optimize the viscosity.

Binder solution . . . 40 parts by weight

MEK (methyl ethyl ketone) . . . 15 parts by weight

Toluene . . . 15 parts by weight

Cyclohexanone . . . 15 parts by weight

The resultant mixture was dispersed with a sand mill.

[Step of Viscosity Adjustment]

A viscosity-adjusting liquid was prepared by charging the following components in an agitator and stirring them for one hour.

Stearic acid . . . 0.5 part by weight

Myristic acid . . . 0.5 part by weight

Butyl stearate . . . 0.5 part by weight

MEK (methyl ethyl ketone) . . . 65 parts by weight

Toluene . . . 65 parts by weight

Cyclohexanone . . . 65 parts by weight

The viscosity-adjusting liquid was subjected to 8 hours' circulating filtration with a depth filter having a 95% cut filtration accuracy=1.2 μm.

The viscosity-adjusting liquid after the circulating filtration and the slurry after the dispersing treatment were mixed and the resultant mixture was dispersed with a sand mill to obtain a paint, 50 cp in viscosity, for the formation of the magnetic layer. This paint was subjected to 8 hours' circulating filtration with a depth filter having a 95% cut filtration accuracy=1.2 μm. The viscosity adjustment was carried out by following the procedure used for the paint for the formation of the backcoat layer mentioned above.

[Step of Final Adjusting Paint]

A paint for the magnetic layer was obtained by mixing 100 parts by weight of the paint after the filtration with 0.8 part by weight of an isocyanate compound (produced by Nippon Poriuretan and marketed under trademark designation of "Coronate L").

The paints prepared as described above were used to produce magnetic recording media by the following procedure.

(Test Example 1)

First, a varying paint for the formation of a backcoat layer shown in Table 1 below was applied on a nonmagnetic support, 14.5 μm in thickness, made of polyester. The applied layer of the paint was dried and given a calendering treatment to form a backcoat layer, 0.5 μm in thickness.

Then, the magnetic paint mentioned above was applied on the surface opposite the surface basing the backcoat layer. The applied layer of the magnetic paint was oriented, dried, calendered, and cured to form a magnetic layer, 3.0 μm in thickness. Thus various samples of magnetic recording medium shown in Table 1 were produced.

Before and after the production of the sample of magnetic recording medium, the relevant paint for the formation of the backcoat layer was tested for dispersibility of paint (degree of gloss), stability of paint (change of degree of gloss during the dilution from the viscosity proper for dispersion to that proper for application to surface), electromagnetic conversion property (Y-S/N and C-S/N), and scraping of backcoat layer by the following methods.

Dispersibility of Paint for Backcoat Layer (Degree of Gloss)

The paint for the formation of the backcoat layer was tested for degree of gloss (%) before dilution by using a digital glossimeter produced by Murakami Shikisaigijutsu Kenkyusho and marketed under product code of "GM-3D." The magnitude of the degree of gloss consequently found was reported as the result of evaluation. The degree of gloss (%) was determined at a measuring angle of 60° under the conditions conforming to the method specified in JIS (Japanese Industrial Standard)-Z-8741.

Stability of Paint for Backcoat Layer

The difference of (B)–(A), wherein (A) stands for the degree of gloss before the dilution mentioned above (during the dispersion) and (B) for the degree of gloss after the dilution of the paint for the formation of the backcoat layer and the subsequent 12 hours' dispersion by stirring, was reported as the result of evaluation of the stability of the relevant paint for the backcoat layer.

The paint gives a plus value for this difference of (B)–(A) when it is stable and, when diluted, forms no agglomeration (already confirmed by a microscopic examination). It gives a minus value for the difference of (B)–(A) when it lacks stability and, when diluted, forms agglomeration and the applied layer thereof suffers degradation of surface properties (already confirmed by a microscopic examination) and brings about adverse effects on the electromagnetic conversion property.

Electromagnetic Conversion Property

<Y-S/N>

On a tape sample subjected to the test for this property, a 50% white signal was recorded and regenerated to determine the S/N ratio by the use of a noise meter produced by Shibasoku and marketed under product code of "925D." The S/N ratio was rated based on the relative value using 0 dB for the Y-S/N of Sample No. 10 (shown in Table 1 below). For the evaluation of this property, a deck produced by Japan Victor Corporation and marketed under product code of "BR-S711 (S-VHS format VTR)."

<C-S/N>

On a tape sample subjected to the test for this property, a color video signal of a specified level having a 100% chroma signal overlapped on a 50% white signal was recorded and regenerated to determine the S/N ratio (the AM component) by the use of a noise meter produced by Shibasoku and marketed under product code of "925D." The S/N ratio was rated based on the relative value using 0 dB for the Y-S/N of Sample No. 10 (shown in Table 1 below). For the evaluation of this property, a deck produced by Japan Victor Corporation and marketed under product code of "BR-S711 (S-VHS format VTR)" was used.

Scraping of Backcoat Layer

Tape samples were reciprocated 100 times on a VTR severally under three environments, i.e. low temperature (0° C.), normal temperature and normal humidity (20° C., 60% RH), and high temperature and high humidity (40° C., 80% RH). They were then observed visually and with the aid of an optical microscope to determine whether or not their backcoat layers had sustained scraping or damage. The damaged tape samples were rated as rejectable. For each of the environments, 36 pieces of tape were prepared and subjected to the test running under the conditions described above. After the test, a count was taken of pieces of rejectable tapes and the count was used for the rating on the following four-point scale. For the present evaluation, a deck produced by Japan Victor Corporation and marketed under product code of "BR-S711 (S-VHS format VTR)" was used.

⊚: Number of rejectable pieces=0

○: Number of rejectable pieces=1 or 2

Δ: Number of rejectable pieces=3 through 5

X: Number of rejectable pieces=6 or over

The results of the tests for the various properties mentioned above are shown in Table 1 below in combination with compositions of relevant copolymers used in the tests.

TABLE 1

| | Paint for formation of backcoat layer | | | | | | | | |
|---|---|---|---|---|---|---|---|---|---|
| | Vilyl chloride-based copoymer | | | Ure-thane | Degree of gloss(%) | | | Electromagnetic conversion property | Scraping of |
| Sample No. | Weight ratio of monomers (m1:m2:m3:m4:m5) | n | R (wt %) | resin R (wt %) | Dispersing step(A) | Diluting step(B) | (B) - (A) | Y-S/N | C-S/N | backcoat |
| 1 | 91:3:5:0.5:0.5 | 400 | 50 | 50 | 120 | 125 | +5 | +1.0 | +1.2 | ⊚ |
| 2 | 91:3:5:0.5:0.5 | 400 | 30 | 70 | 118 | 121 | +3 | +0.8 | +0.7 | ⊚ |
| 3 | 91:3:5:0.5:0.5 | 400 | 70 | 30 | 122 | 124 | +2 | +1.0 | +0.8 | ○ |
| 4 | 91:3:5:0.5:0.5 | 300 | 50 | 50 | 123 | 123 | 0 | +0.7 | +0.8 | ○ |
| 5 | 91:3:5:0.5:0.5 | 500 | 50 | 50 | 118 | 121 | +3 | +0.8 | +0.9 | ⊚ |
| 6 | 91:3:4.5:1.0:0.5 | 400 | 50 | 50 | 123 | 124 | +1 | +0.8 | +1.0 | ⊚ |
| 1 | 91:3:4:1.5:0.5 | 400 | 50 | 50 | 125 | 125 | 0 | +1.0 | +1.3 | ⊚ |
| 8 | 91:3:4.5:0.5:1.0 | 400 | 50 | 50 | 120 | 122 | +2 | +0.7 | +0.6 | ⊚ |
| 9 | 91:3:4:0.5:1.5 | 400 | 50 | 50 | 122 | 123 | +1 | +0.6 | +0.6 | ⊚ |
| 10 * | 91:3:6:0:0 | 400 | 50 | 50 | 98 | 98 | 0 | 0.0 | 0.0 | Δ |
| 11 * | 91:3:5.5:0:0.5 | 400 | 50 | 50 | 110 | 112 | +2 | +0.2 | +0.3 | Δ |
| 12 * | 91:3:5.5:0.5:0 | 400 | 50 | 50 | 121 | 97 | −23 | −0.1 | −0.2 | x |
| 13 * | Sample No. 11 + Sample No. 12 | 400 | 25 + 25 | 50 | 115 | 107 | −8 | −0.1 | +0.1 | Δ |

The mark * indicates (comparative example) deviating from the scope of this invention.
The symbol (m1:m2:m3:m4:m5) represents the weight ratio of monomers (vinyl chloride:vinyl acetate:vinyl alcohol:amine-modified vinyl:acidic functional group-containing vinyl).
Sample No. 13 is the mixture of Sample No. 11 with Sample No. 12.
n: Average polymerization degree
R: Ratio of combination S/N ratio was rated based on the relative value using 0 dB for the Y-S/N of Sample No. 10 (shown in Table 1 below). For the evaluation of this property, a deck produced by Japan From the results shown in Table 1, it is noted that the paints of this invention having both an amine-modified vinyl unit and an acidic functional group-containing vinyl unit contained in one and the same vinyl chloride-based copolymer showed highly satisfactory degrees of gloss at the dispersing step, indicating that the dispersion was perfect. They showed highly satisfactory stability of paint, that is, degrees of gloss after the diluting step, indicating that the applied films of these paints were excellent in surface properties. The films showed the best electromagnetic conversion property.

It is noted that the paints containing an amine-modified vinyl unit and not containing an acidic functional group-containing vinyl unit showed no stability and incurred secondary agglomeration at the diluting step and the applied films of these paints suffered degradation of surface properties and consequent degradation of electromagnetic conversion property. The paints containing an acidic functional group-containing vinyl unit and not containing an amine-modified vinyl unit failed to show good dispersibility and failed exhibit the best electromagnetic conversion property. The stability of paint at the diluting step posed no serious problem. The paint containing neither an amine-modified vinyl unit nor an acidic functional group-containing vinyl unit showed bad dispersibility because it lacked affinity for carbon black.

(Test Example 2)

Magnetic recording media of Sample No. 14 (using carbon black A), Sample No. 15 (using carbon black B), and Sample No. 16 (using carbon black C) were produced by following the procedure used in the production of Sample No. 1 of Test Example 1 while changing the carbon black used in Sample No. 1 (produced by Mitsubishi Chemical and marketed under product code of "#47B," average particle diameter 23 nm, BET 130 m$^2$/g, amount of DBP absorbed 64 ml/100 g) respectively to:

① Carbon black A (produced by Mitsubishi Chemical and marketed under product code of "#990B," average particle diameter 16 nm, BET 230 m$^2$/g, amount of DBP absorbed 103 ml/100 g)

② Carbon black B (produced by Mitsubishi Chemical and marketed under product code of "#650B," average particle diameter 18 nm, BET 163 m$^2$/g, amount of DBP absorbed 115 ml/100 g)

③ Carbon black C (produced by Mitsubishi Chemical and marketed under product code of "#52B," average particle diameter 27 nm, BET 113 m$^2$/g, amount of DBP absorbed 60 ml/100 g)

Before and after the production of each of the samples of magnetic recording medium, the relevant paint for the formation of the backcoat layer was tested for dispersibility of paint (degree of gloss), stability of paint (change of degree of gloss during the dilution from the viscosity proper for dispersion to that proper for application to surface), electromagnetic conversion property (Y-S/N and C-S/N), and scraping of backcoat layer by the following methods. The method of evaluation and the scale of evaluation were the same as described above.

The results are shown in Table 2 below.

TABLE 2

| Sample No. | Degree of gloss (%) | | | Electromagnetic conversion property | | Scraping of backcoat |
|---|---|---|---|---|---|---|
| | Dispersing step(A) | Diluting step(B) | (B) − (A) | Y-S/N | C-S/N | |
| 1 | 120 | 125 | +5 | +1.0 | +1.2 | ⊚ |
| 14 | 115 | 117 | +2 | +1.1 | +1.4 | ○ |

TABLE 2-continued

| Sample No. | Degree of gloss (%) | | | Electromagnetic conversion property | | Scraping of backcoat |
|---|---|---|---|---|---|---|
| | Dispersing step(A) | Diluting step(B) | (B) − (A) | Y-S/N | C-S/N | |
| 15 | 117 | 120 | +3 | +1.1 | +1.3 | ⊚ |
| 16 | 119 | 123 | +4 | +0.7 | +0.7 | ⊚ |

(Test Example 3)

Magnetic recording media of Sample No. 17 (using vinyl chloride-based copolymer A), Sample No. 18 (using vinyl chloride-based copolymer B), Sample No. 19 (using vinyl chloride-based copolymer C), and Sample No. 20 (using vinyl chloride-based copolymer D) were produced by following the procedure used in the production of Sample No. 1 of Test Example 1 while changing the vinyl chloride-based copolymer used in Sample No. 1 respectively to:

① Vinyl chloride-based copolymer A: Vinyl chloride/ vinyl acetate/vinyl alcohol/N,N-dimethylethanol amine modified vinyl unit/sodium methacrylsulfonate copolymer= 91/3.0/5.0/0.5/0.5 (by weight %), produced by repeating the procedure used for the production of the vinyl chloride-based copolymer of Sample No. 1 while using sodium methacrylsulfonate in the place of maleic acid.

② Vinyl chloride-based copolymer B: Vinyl chloride/ vinyl acetate/vinyl alcohol/N,N-dimethylethanol amine-modified vinyl unit/2-acid phosphoxyethyl methacrylate copolymer=91/3.0/5.0/0.5/0.5 (by weight %), produced by repeating the procedure used for the production of the vinyl chloride-based copolymer of Sample No. 1 while using 2-acid phosphoxyethyl methacrylate in the place of maleic acid.

③ Vinyl chloride-based copolymer C: Vinyl chloride/ vinyl acetate/vinyl alcohol/methyl amine-modified vinyl unit/maleic acid copolymer=91/3.0/5.0/0.5/0.5 (by weight %), produced by repeating the procedure used for the production of the vinyl chloride-based copolymer of Sample No. 1 while using methyl amine in the place of N,N-dimethylethanol amine.

④ Vinyl chloride-based copolymer D: Vinyl chloride/ vinyl acetate/vinyl alcohol/dimethyl amine-modified vinyl unit/maleic acid copolymer=91/3.0/5.0/0.5/0.5 (by weight %), produced by repeating the procedure used for the production of the vinyl chloride-based copolymer of Sample No. 1 while using dimethyl amine in the place of N, N-dimethylethanol amine.

Before and after the production of each of the samples of magnetic recording medium, the relevant paint for the formation of the backcoat layer was tested for dispersibility of paint (degree of gloss), stability of paint (change of degree of gloss during the dilution from the viscosity proper for dispersion to that proper for application to surface), electromagnetic conversion property (Y-S/N and C-S/N), and scraping of backcoat layer by the following methods. The method of evaluation and the scale of evaluation were the same as described above.

The results are shown in Table 3 below.

TABLE 3

| Sample No. | Degree of gloss (%) | | | Electromagnetic conversion | | Scraping of backcoat |
|---|---|---|---|---|---|---|
| | Dispersing step(A) | Diluting step(B) | (B) − (A) | Y-S/N | C-S/N | |
| 1 | 120 | 125 | +5 | +1.0 | +1.2 | ⊚ |
| 17 | 119 | 123 | +4 | +0.9 | +1.1 | ⊚ |
| 18 | 117 | 122 | +5 | +0.9 | +1.0 | ⊚ |
| 19 | 115 | 117 | +2 | +0.6 | +0.8 | ⊚ |
| 20 | 117 | 120 | +3 | +0.7 | +0.9 | ⊚ |

(Test Example 4)

A test was performed by following the procedure of Test Example 1 while changing the Co-coated γ-iron oxide magnetic powder to a metal magnetic powder (BET 45 m$^2$/g, Hc 1500 Oe). It was consequently confirmed that the results obtained herein were identical to those of Test Example 1 (as shown in Table 1).

(Test Example 5)

A test was performed by following the procedure of Test Example 1 while changing the coating type magnetic layer to a continuous thin film type magnetic layer formed by the vacuum deposition technique (composition: Co/Ni=80/20 (by weight %), magnetic film thickness: 0.15 μm). It was consequently confirmed that the results obtained herein were identical to those of Test Example 1 (as shown in Table 1).

The effect of this invention is evident from the results shown above. To be specific, the magnetic recording medium of this invention comprises a magnetic layer formed on one of the opposite surfaces of a nonmagnetic support and a backcoat layer using a nonmagnetic powder and a binder as main components thereof and formed on the other surface thereof and uses as the binder in the backcoat layer the vinyl chloride-based copolymer having the amine-modified vinyl unit and the acidic functional group-containing vinyl unit. Owing to this construction, a paint to be used therein realizes perfect dispersibility and perfect stability. As a result, the backcoat layer to be formed therein is enabled to acquire excellent surface properties and the magnetic recording medium to be finally produced is allowed to exhibit an excellent electromagnetic conversion property.

What is claimed is:

1. A magnetic recording medium comprising a nonmagnetic support having opposite surfaces and provided on one of said opposite surfaces with a magnetic layer and on the other surface thereof with a backcoat layer having a nonmagnetic powder and a binder as main components thereof, wherein said binder in said backcoat layer contains a vinyl chloride copolymer having an amine-containing vinyl unit and an acidic functional group-containing vinyl unit in the same molecular unit, wherein the content of said amine-containing vinyl unit is in the range of 0.03 to 2.3% by weight, based on the amount of said vinyl chloride copolymer and the content of said acidic functional group-containing vinyl unit is in the range of 0.05 to 1.85% by weight, based on the amount of said vinyl chloride copolymer.

2. A magnetic recording medium according to claim 1, wherein the content of said amino-containing vinyl unit is in the range of 0.1 to 1.8% by weight, based on the amount of said vinyl chloride copolymer.

3. A magnetic recording medium according to claim 1, wherein said vinyl chloride copolymer has an average polymerization degree in the range of 200 to 800.

4. A magnetic recording medium according to claim 1, wherein the content of said vinyl chloride copolymer is in the range of 20 to 80% by weight to the total amount of the binder in said backcoat layer.

5. A magnetic recording medium according to claim 1, wherein the nonmagnetic powder in said backcoat layer is carbon black and said carbon black is a mixture of a small-diameter carbon black having an average particle diameter in the range of 15 to 30 nm and a large-diameter carbon black having an average particle diameter in the range of 200 to 400 nm.

6. A magnetic recording medium according to claim 5, wherein the content of the large-diameter carbon black is in the range of 0.5 to 5 parts by weight, based on 100 parts by weight of the small-diameter carbon black.

\* \* \* \* \*